D. J. COGDILL.
VEHICLE HEADLIGHT PILOT.
APPLICATION FILED JAN. 23, 1915.

1,174,687.

Patented Mar. 7, 1916.
2 SHEETS—SHEET 1.

Inventor,
Dallas J. Cogdill.

Witnesses:
C. Feinle, Jr.
Frank Hough

By Victor J. Evans,
Attorney.

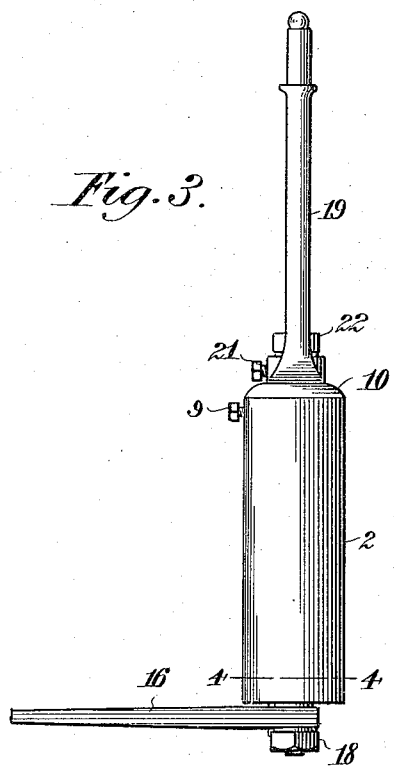
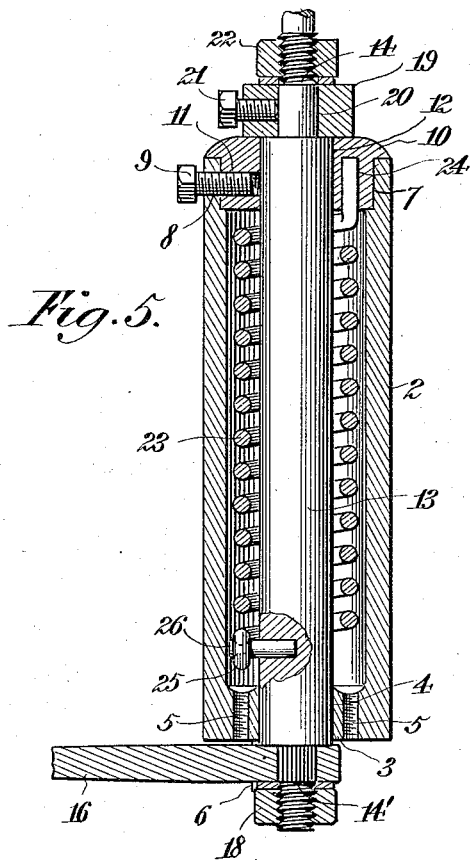
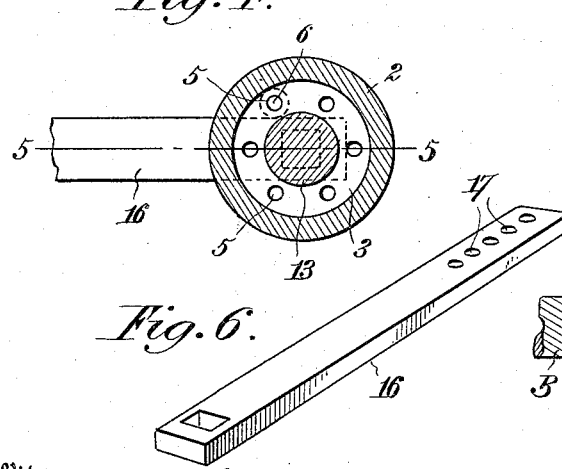
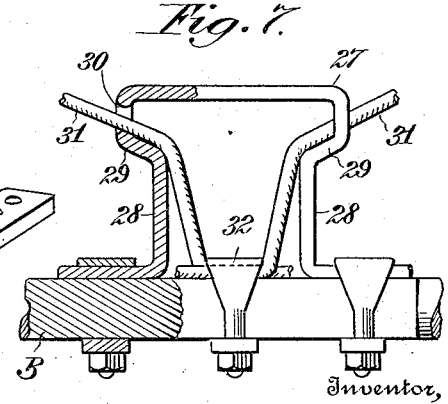

UNITED STATES PATENT OFFICE.

DALLAS J. COGDILL, OF SPOKANE, WASHINGTON, ASSIGNOR TO O. K. AUTO PARTS COMPANY, OF SPOKANE, WASHINGTON, A CORPORATION OF WASHINGTON.

VEHICLE-HEADLIGHT PILOT.

1,174,687.      Specification of Letters Patent.      Patented Mar. 7, 1916.

Application filed January 23, 1915. Serial No. 4,003.

*To all whom it may concern:*

Be it known that I, DALLAS J. COGDILL, a citizen of the United States, residing at Spokane, in the county of Spokane and State of Washington, have invented new and useful Improvements in Vehicle-Headlight Pilots, of which the following is a specification.

This invention relates to vehicle headlight pilots, and it has for its primary object to provide a device of this character which is connected to both of the headlights of the vehicle, but through the operation of the device only one of said lights is turned in the direction of the path of travel of the vehicle when rounding a curve.

A further object of the invention is to provide a vehicle light pilot in which a pair of flexible members are secured to the knuckle connecting rod of the vehicle, said members being also connected with the arms upon the lamp actuating and supporting members secured to the frame of the automobile or vehicle, the flexible members coöperating when the steering gear of the vehicle is operated to turn the wheels of the vehicle and one of the lamps in the new direction of travel and also to prevent the strain and vibration due to the oscillatory movement of the wheels of the vehicle when traveling over an uneven road being communicated to the actuated lamp upon the vehicle.

A further object of the invention is to provide a mechanism of the character described in which the parts may be so adjusted that when operated to cause either one of the lamps to throw the rays therefrom at a tangent to the line of travel of the vehicle slightly in advance of the turning movement of the front wheels of the same strain is not imposed upon the vehicle steering gear more than is normally required to turn either of said lamps in unison with the vehicle wheel adjacent thereto.

The invention consists in the improved construction and novel arrangement and combination of parts which will be hereinafter fully described and particularly pointed out in the claim.

The preferred embodiment of the invention has been illustrated in the accompanying drawings, but no restriction is necessarily made to the precise details of construction therein shown, as changes, alterations and modifications within the scope of the claim may be resorted to when desired.

Figure 1:
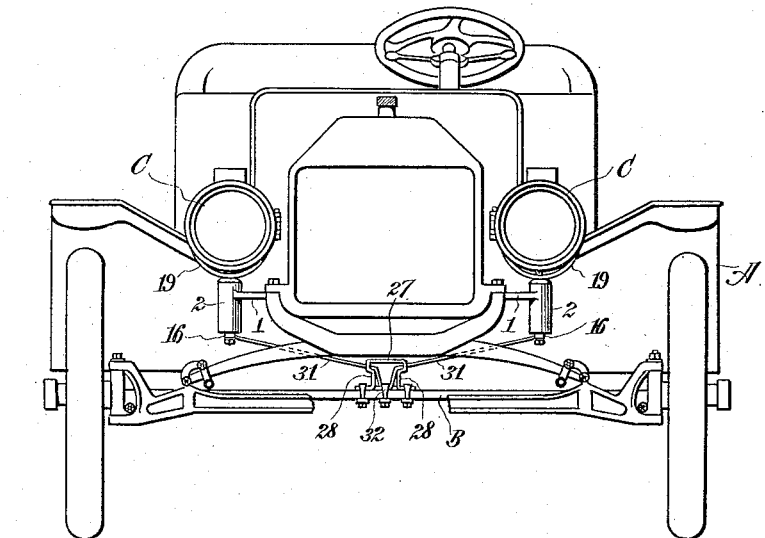
Figure 2:
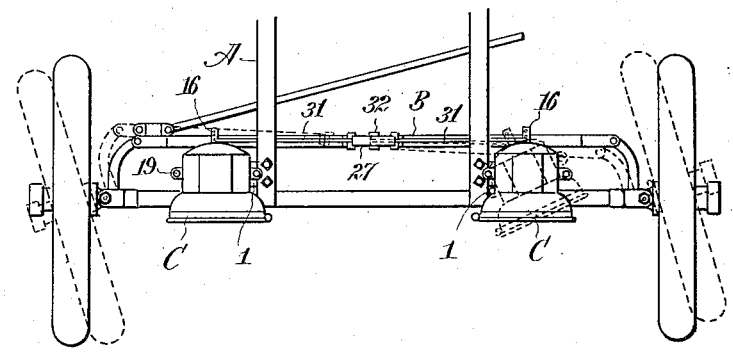

In the drawings, Figure 1 is a front elevation of a portion of an automobile showing the device constructed in accordance with the invention applied thereto. Fig. 2 is a top plan view of the wheels and a portion of the chassis of an automobile, showing in full lines the invention applied thereto and in dotted lines the position of the lamps and wheels of the vehicle when the automobile is rounding a curve. Fig. 3 is a side elevation of one of the sleeves and a lamp supporting bracket. Fig. 4 is a section on the line 4—4 of Fig. 3. Fig. 5 is a section on the line 5—5 of Fig. 4. Fig. 6 is a detail perspective view of the lamp actuating arm. Fig. 7 is a side view partly in section of the saddle or yoke for securing the flexible members to the knuckle connecting rod of the vehicle.

Like characters of reference denote corresponding parts throughout the several views.

The letter A designates the wheels and body portion of an automobile having a knuckle connecting rod B and headlight C. Rigidly secured upon each side of the body A of the machine through the medium of lugs 1 are sleeves 2, the bottom portions 3 of which are provided with central openings 4 and a series of threaded recesses 5 adapted to receive stop members 6. The upper portions of the sleeves 2 are recessed, as at 7, and provided with slots or openings 8 adapted to receive screws 9. Mounted within the openings 7 in the sleeves 2 are bushings 10, each of which is provided with a screw threaded opening 11 adapted to receive the screws 9 carried in the slots 8 of the sleeves 2.

Each of the bushings 10 is further provided with a central opening 12 which, together with the openings 4 in the bottoms 3 of the sleeves, form bearings for vertically disposed rotatable cores 13. The cores 13 have their opposite ends reduced and threaded, as at 14 and 14', the ends 14' being squared for a portion of their length and adapted to receive arms 16 having a series of openings 17 therein, the said arms being held in place upon the squared portions 14' by means of nuts and spring washers 18.

The ends 14 of the cores 13 are adapted to receive a U-shaped bracket 19 which supports the usual headlight C of the vehicle, and these brackets 19 are further provided with central openings 20 and set screws 21 for engagement with a portion of the reduced ends 14 of the cores 13, and are secured in place upon said ends by nuts and spring washers 22. Mounted within the casings 2 upon each of the cores 13 is a coiled spring 23 having one end secured in a recess 24 in the bushings 10 and its opposite end secured, as at 25, to a pin 26 in the cores 13, said springs being adapted to normally hold the arms 16 against the stop members 6 in the bottoms 3 of the sleeves 2, and the lamps upon the yokes 19 in a plane parallel to the longitudinal centers of the arms 16.

Secured centrally of the knuckle connecting rod of the motor vehicle by clips 19 is a U-shaped yoke 27, the arms 28 of which are formed with saddle portions 29 and openings 30, said openings and saddle portions being adapted to receive a pair of flexible lamp actuating members 31. The latter are connected with one of the openings 17 in the arms 16 and have their opposite ends fastened upon the knuckle connecting rod at a point directly in line with the longitudinal center of the motor vehicle by clips 32. By turning the members 31 over the saddle portions 29 the yoke 27 serves as a bridge, and the vibration transmitted to the members 31 through the travel of the wheels of the vehicle at high speed over a rough road is absorbed by the unison in the vibration of the members 31, thereby preventing unnecessary flickering of the lamps.

From the foregoing description, taken in connection with the accompanying drawings, it will be seen that when the device is applied to a motor vehicle both lamps or headlights are held in their normal position or in a position to throw their rays in advance of the vehicle parallel to the path of travel of the same. When it is desired to turn the vehicle from a straight course, the action of the knuckle connecting rod upon the members 31 will cause the lamp upon the side of the vehicle adjacent to the new direction of travel to simultaneously move with the wheel upon that side of the vehicle, while the lamp upon the opposite side thereof remains in its normal position. Should it be desired to have the lamp move slightly in advance of the turning movement of the wheels of the vehicle, the members 31 are adjusted upon the arms 16 through one of the openings 17 in said arms near to the connection of said arms with the cores 13. When it is necessary to adjust only one of the lamps in this manner an abnormal influence is exerted upon the steering gear of the vehicle by one of the springs 23 due to the decrease in the leverage of the arms 16 upon which the adjustment is made. To obviate this difficulty it is only necessary to adjust the bushing 10 within the sleeve 2 to relieve the tension of the spring 23 upon the arm 16. When it is desired to increase the tension of the spring 23 upon the arm 16, the said arm may be adjusted upon the squared portion 14' of the core 13 and the stop member 6 engaged with one of the recesses 5 in the sleeve 2. By use of the flexible members 24 secured to the knuckle connecting rod at a point directly in line with the longitudinal center of the vehicle and providing arms 16 whose length is equal to the longitudinal movement of said rod, the oscillatory movement of the front axle due to travel over an uneven road is compensated for at all times even when the device is in operation.

When it is desired to have the lamps normally throw their beams at a slight tangent to the line of travel of the vehicle, the stop members 6 are adjusted within the recesses 5 in the sleeves 2 and the flexible members 31 adjusted by means of the clips 32. By providing the yoke 19 with the screw 21 any minor adjustment of the lamps may be made which may be found necessary. By having the cores 13 free to move vertically in the sleeves 2 against the action of the springs 23 a cushion for the cores 13 is formed, preventing vibration from the body of the vehicle being transmitted to the lamps.

Having thus described the invention, what is claimed as new, is:—

In a device of the class described, a vehicle having steering knuckles, a movable rod connected with the knuckles, sleeves mounted on the vehicle, cores journaled in the sleeves, arms mounted on the cores, means connecting the arms with the rod, said sleeves having openings in the bottom thereof, springs secured to the cores and connected with the sleeves and adapted to actuate said cores, and stop members one upon each sleeve located in the path of movement of the arms on the cores and against which said arms are normally held in contact by said springs, said stop members being removably secured in the openings in the bottom of the sleeves and adapted to assist in regulating the action of the above mentioned spring upon said cores.

In testimony whereof I affix my signature in presence of two witnesses.

DALLAS J. COGDILL.

Witnesses:
GEORGE D. LANTZ,
SUSIE SARTWELL.

Copies of this patent may be obtained for five cents each, by addressing the "Commissioner of Patents, Washington, D. C."